Aug. 9, 1927.
W. J. BELCHER
1,638,139
TRANSMISSION CHAIN
Filed Aug. 13, 1924
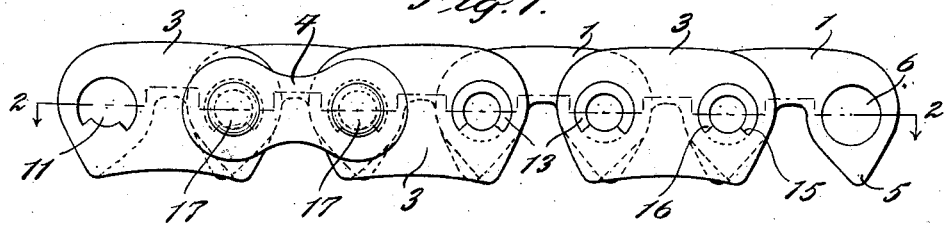
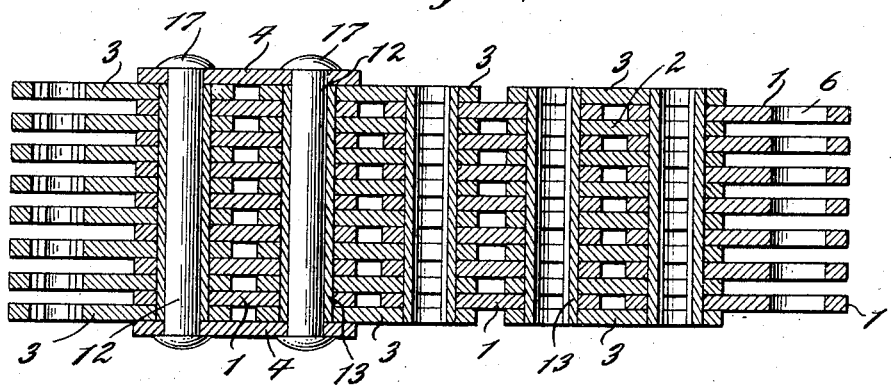
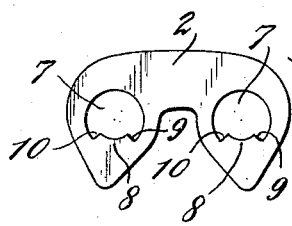
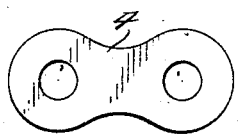
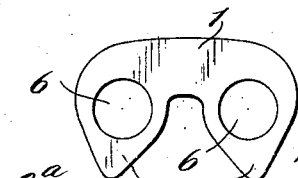
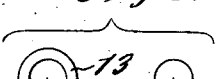
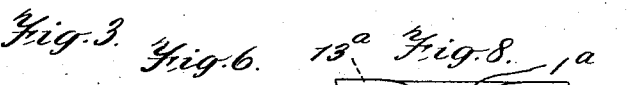
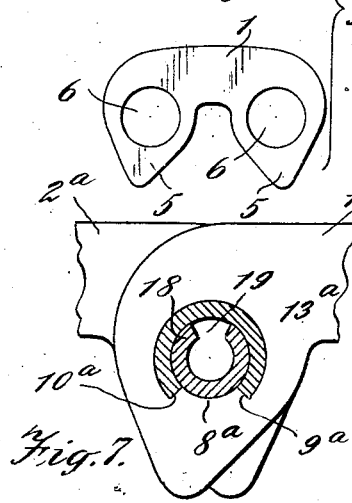
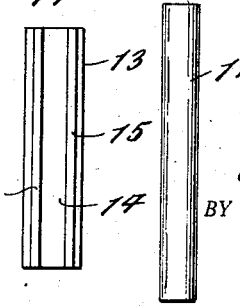

Patented Aug. 9, 1927.

1,638,139

UNITED STATES PATENT OFFICE.

WARREN J. BELCHER, OF HARTFORD, CONNECTICUT, ASSIGNOR TO THE WHITNEY MFG. CO., OF HARTFORD, CONNECTICUT, A CORPORATION OF CONNECTICUT.

TRANSMISSION CHAIN.

Application filed August 13, 1924. Serial No. 731,716.

My invention relates to transmission chains of the silent link type. Heretofore difficulty has been experienced in properly lubricating chains of this type, particularly such chains that run at relatively high speeds, because of the tendency of the lubricant to be thrown from the chain by centrifugal force. I have devised a chain with the parts so arranged as to overcome this difficulty and to greatly increase the life of the chain. My chain is also quieter than chains of this type as heretofore constructed.

My chain also has other advantages which will be apparent upon reading the following specification.

My invention will be better understood by reading the following description taken in connection with the accompanying drawing illustrating one embodiment of my invention, and in which:

Fig. 1 is a side elevation of the chain partly in section embodying my invention;

Fig. 2 is a longitudinal section taken on the line 2—2 of Fig. 1;

Fig. 3 is a side elevation of the toothed links used in the chain;

Fig. 4 is a side elevation of a guide link;

Fig. 5 is a side elevation of an end link;

Fig. 6 shows a side and end view of a pivot pin and bushing used in the chain;

Fig. 7 shows a side elevation of a modified joint partly in section; and

Figs. 8 shows a side elevation of a portion of a chain having the joint shown in Fig. 7.

As will be seen by reference to Figs. 1 and 2, my chain comprises a series of links 1 arranged side by side and a series of links 2 also arranged side by side. The ends of the links 1 and 2 overlap and are provided with registering openings through which the pivoting means, later described, extend. Guide links 3 are placed on the outer sides of the chain and have the well-understood effect of guiding the chain on the sprockets. These guide links may be placed in the center of the chain or guide links may be placed both on the sides and the center, or otherwise, as desired. End links 4 are placed on the outside of guide links for the purpose of holding the parts in position, as will later be explained. The end links 4 are repeated throughout the length of the chain. Only two are shown for the purpose of clarity.

As will be seen from Fig. 3, the links 1 are provided with teeth 5 and with circular openings 6, one set of openings being placed in each end of each link.

The links 2 are also provided with openings 7 in the ends thereof, but these openings in the link shown, are interrupted by a projection 8 forming stops 9 and 10 for a purpose which will appear later. The openings 7 are circular except for the projections 8. Some of the links 2 may have circular openings to fit the outside of the bushings snugly, if desired. In fact all the links 2 may have such openings and the projections 8 be placed only on the guide links 3.

The guide links 3 shown in Fig. 4, have openings 11 which are identical with the openings 7 shown in the links 2.

The end links 4 have circular openings in the ends thereof which are smaller in diameter than the openings 6 in the links 1.

The pivoting means for each joint comprises a pin 12 and a bushing 13, shown in Fig. 6. The bushing 13 is provided with a longitudinal slot 14 which, in the embodiment shown, extends throughout the length of the bushing. This slot is preferably so arranged as to face the inside of the chain when it is on the sprockets. The bushing therefore forms a receptacle for the lubricant and this action is assisted by the links 2 and/or 3, which, by reason of the projections 8 hold the lubricant in the bushings and by the links 4 which close the ends of the bushings. If desired, however, this slot may extend through a portion only of the length thereof, or may consist of a series of openings in an otherwise cylindrical bushing. The pin 12 when the chain is assembled, extends through the bushing 13, as shown in Fig. 2. The bushing is slightly larger than the pin so that the pin is free to rotate in the bushing. The pin 12 may be solid as shown or hollow or a slotted bushing, as shown in Figs. 7 and 8.

The edges 15 and 16 of the bushing engage the stops 9 and 10 on the projection 8 on links 2 and/or 3, as shown in Fig. 1. It will be noted that the openings 7 and 11 in links 2 and 3 are large enough to take the bushing, but are so proportioned relative to the bushing that the bushing fits snugly in the opening and engages the projections, as above explained. While I prefer to use projections such as 8 to insure the rotation of the bushings with the links 2 and 3, this same result may be secured by so proportioning the size of the openings and the size of the bushings as to cause the links 2 and 3 to grip the bushings with sufficient force to rotate the same without using any projections whatever. Many other arrangements may be provided for causing the bushings to rotate with the links 2 and 3. The openings 6 in the links 1 are slightly larger in diameter than the bushings so that the links 1 turn freely on the bushings when the joint is flexed. The end links 4 have openings which are of suitable size to take the pin 12. The ends of the pin 12 are riveted over, as shown at 17 in Fig. 2, so that the pins rotate with the end links 4; the bushings rotate with the links 2 and 3 and the links 1 rotate on the outside of the bushings 13 during the flexing of the joint.

As shown in Fig. 2, the bushings extend throughout the width of the chain except the end links 4, the ends of the bushings abutting against the sides of these links.

In Figs. 7 and 8, I have shown a modified joint for the chain wherein the parts are marked with numbers corresponding to those in Figs. 1 to 6, but having the letter "a" applied thereto. In this joint I have substituted for the pin 12 a slotted member 18. The member 18 is so arranged in the joint that the slot 19 therein is preferably 180 degrees from the slot 14 in the bushing 13$^a$. The members 18 extend entirely across the chain and their ends project through the openings in the links 4$^a$ and are riveted over at their ends, as shown at 20, so that the members 18 are rigidly held in the end of the links 4$^a$ and rotate with these links in the same manner as the pins 12 do with the links 4. In this construction the lubricant finds lodgment on the member 18 in the same manner as on the pin 12 in Figs. 1 to 6. From this position the lubricant works itself between the inside of the bushing 13$^a$ and the outside of the member 18 and thus thoroughly lubricates the joint. By using a hollow member 18 instead of a pin, the chain is made considerably lighter without sacrificing strength. For the same reason a substantial saving in material is effected without detracting from the strength or efficiency of the chain.

From the foregoing it will be seen that the longitudinal slots in the bushings provide passage through which the lubricant may pass into the joints of the chains and the bushings act as receptacles for retaining the lubricant against expulsion by centrifugal force; the links 2 and 3 snugly fit the exterior of the bushings and are so arranged that the bushings move with these links; the snug fit of the end links 4 with the pins 12 and members 18 causes these members to rotate with these links. The freedom of the links 1 to rotate with respect to the bushings 13 makes a bearing between these links and the bushings so that by this construction a relatively large bearing area is provided throughout the width of the chain between the pins and the inside of the bushings, and the links 1 have a bearing on the outside of the bushings. This reduces the wear at the joints and greatly increases the life and durability of the chain. Because of its form as shown in the embodiment illustrated the bushing 13 may be made inexpensively from a strip of stock metal by simply curling the same edgewise. The opening or slot also reduces the amount of metal in the bushings which reduces the cost of the chain. Other advantages of the construction shown will be apparent to those skilled in the art.

I claim:

1. A chain of the silent link type comprising a plurality of sets of links, said links having openings in their ends, means passing through said openings including a bushing having a slot therein, said bushing being arranged to rotate with one set of links and the adjacent set of links being arranged to rotate around the outside of said bushings as the joints are flexed.

2. A chain of the silent link type comprising a plurality of sets of links, said links having openings in their ends, means passing through said openings including a bushing having a slot, a pin passing through the bushing, certain of the links being fastened to the pin and certain of the links being arranged to freely turn around the outside of said bushings.

3. A chain of the silent link type comprising a plurality of sets of links, said links having openings in their ends, means passing through said openings including a bushing having a slot, a pin passing through the bushing, certain of the links being fastened to the pin, certain of the links being fastened to the bushing and certain of the links being free to rotate on the outside of the bushing.

4. In a chain of the silent link type, a plurality of sets of links, means for pivoting said sets of links comprising a hollow member adapted to rotate with one set of links and a pin fastened in the outside links of the other set and openings in intermediate links of the same set through which said hollow member passes, said hollow member having an opening facing the inside of the chain when on the sprockets to admit a lubricant.

5. In a chain of the silent link type, a plurality of sets of links, means for pivoting said sets of links comprising a hollow member adapted to rotate with one set of links and extending throughout the width of that set of links, a member fastened in the outside links of the other set and forming a bearing on the inside of the hollow member, the intermediate links of the same set having openings in the ends thereof and forming a bearing on the outside of the hollow member, said hollow member having an opening facing the inside of the chain to admit and hold a lubricant.

6. A chain of the silent link type comprising a plurality of sets of links having openings in their ends, means passing through said openings comprising a pin and a bushing around the pin, free to rotate thereon, a plurality of links engaging the pins and rotating the same therewith, links engaging the bushing and turning therewith and links turning on said bushing when the joint is flexed, said bushing having a longitudinal slot therein, thereby causing the bushing to yield when opposite forces engage opposite sides of the bushing.

7. A chain of the silent link type comprising a plurality of sets of links having openings in their ends, means passing through said openings comprising a pin and a bushing around the pin adapted to rotate freely thereon, side links engaging the pin and moving therewith, links engaging the brushing and turning therewith and links turning on said bushing when the joint is flexed, said bushing having a longitudinal slot therein.

WARREN J. BELCHER.